United States Patent [19]
Canup et al.

[11] 3,976,043
[45] Aug. 24, 1976

[54] MEANS AND METHOD FOR CONTROLLING THE OCCURRENCE AND THE DURATION OF TIME INTERVALS DURING WHICH SPARKS ARE PROVIDED IN A MULTICYLINDER INTERNAL COMBUSTION ENGINE

[75] Inventors: Robert E. Canup, Chester; Aubrey T. Burton, Richmond, both of Va.

[73] Assignee: Texaco Inc., New York, N.Y.

[22] Filed: Dec. 19, 1974

[21] Appl. No.: 534,253

[52] U.S. Cl. .......................... 123/148 E; 123/117 R
[51] Int. Cl.² ......................... F02P 5/04; F02P 1/00
[58] Field of Search .... 123/32 EA, 117 R, 146.5 A, 123/148 E

[56] References Cited
UNITED STATES PATENTS

| | | | |
|---|---|---|---|
| 3,454,871 | 7/1969 | Nolting | 123/117 R |
| 3,689,753 | 9/1972 | Williams et al. | 123/32 EA |
| 3,689,755 | 9/1972 | Hodgson et al. | 123/32 EA |
| 3,738,339 | 6/1973 | Huntzinger et al. | 123/117 R |
| 3,749,073 | 7/1973 | Asplund | 123/117 R |
| 3,752,139 | 9/1973 | Asplund | 123/117 R |
| 3,757,755 | 9/1973 | Carner | 123/117 R |
| 3,808,513 | 4/1974 | Canup | 123/148 E |
| 3,831,563 | 8/1974 | Brittain et al. | 123/32 EA |
| 3,853,103 | 12/1974 | Wahl et al. | 123/117 R |
| 3,855,973 | 12/1974 | Scofield | 123/146.5 A |

*Primary Examiner*—Charles J. Myhre
*Assistant Examiner*—Ronald B. Cox
*Attorney, Agent, or Firm*—T. H. Whaley; C. G. Ries

[57] ABSTRACT

A control system controls the occurrence and duration of time intervals during which sparks may be provided in the cylinders of an internal combustion engine driving a crankshaft as a function of loading parameters on the engine. In an automotive engine control system, parameters such as the vacuum in the carburetor, the throttle setting and the torque of the crankshaft are sensed and corresponding signals are provided by the sensors. A first pulse signal is provided. The pulses in the first pulse signal correspond to the rotational speed of the crankshaft. The distributor provides a second pulse signal. Each pulse in the second pulse signal has a width corresponding to a predetermined rotational displacement of the crankshaft and has a relationship to the position of a piston in a corresponding cylinder. A circuit shapes the pulses of the second pulse signal and provides them to a network which provides a start pulse in accordance with the shaped pulses and the first pulse signal. A preload circuit preloads a counter in the start pulse network in accordance with the sensed parameter signals and the first pulse signal to control the occurrence of the start pulses. A second network provides a stop signal in accordance with the first pulse signal and a spark time interval pulse signal. A pulse circuit receiving the spark pulses and the stop signal provides the spark time interval pulse signal to the ignition system and to the stop signal network so that the stop signal network controls the duration of each pulse in the spark time interval pulse signal. The ignition system provides sparks in the engine in a predetermined manner during the occurence of a pulse in the spark time interval pulse signal.

8 Claims, 2 Drawing Figures

MEANS AND METHOD FOR CONTROLLING THE OCCURRENCE AND THE DURATION OF TIME INTERVALS DURING WHICH SPARKS ARE PROVIDED IN A MULTICYLINDER INTERNAL COMBUSTION ENGINE

BACKGROUND OF THE INVENTION

Field of the Invention

The present invention relates to control systems in general and, more particularly, to a control system for controlling the occurrence and duration of sparks being provided to various cylinders in an internal combustion engine.

SUMMARY OF THE INVENTION

A system controls the occurrence and duration of time intervals during which sparks are provided in a multicylinder internal combustion engine, for driving a crankshaft, in which each cylinder has a moveable piston. The system includes a distributor providing first and second pulse signals. Each pulse in the first pulse signal occurs after the crankshaft has moved through a predetermined angle of displacement. Each pulse in the second pulse signal has a width corresponding to a predetermined rotational displacement of the crankshaft. A shaping circuit shapes the pulses in the second pulse signal. A pulse circuit provides a spark time interval pulse signal. Each pulse in the spark time interval pulse signal starts in response to a start pulse and terminates in response to a stop signal. A programmable network provides the start pulses in accordance with the shaped pulses. Sensors sense the operating parameters of the engine and of the crankshaft and provide corresponding signals. A programming circuit programs the programmable network in accordance with the sensed parameter signals and the first pulse signal so as to control the occurrence of the start pulses. Another network provides a stop signal to the spark time interval pulse circuit in accordance with the first pulse signal from the distributor and the spark time interval pulse signal so as to control the duration of each spark time interval pulse. An ignition system provides sparks in the engine during the occurrence of a pulse in a spark time interval pulse signal and does not provide sparks in the engine when a pulse in the spark time interval pulse signal does not occur.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
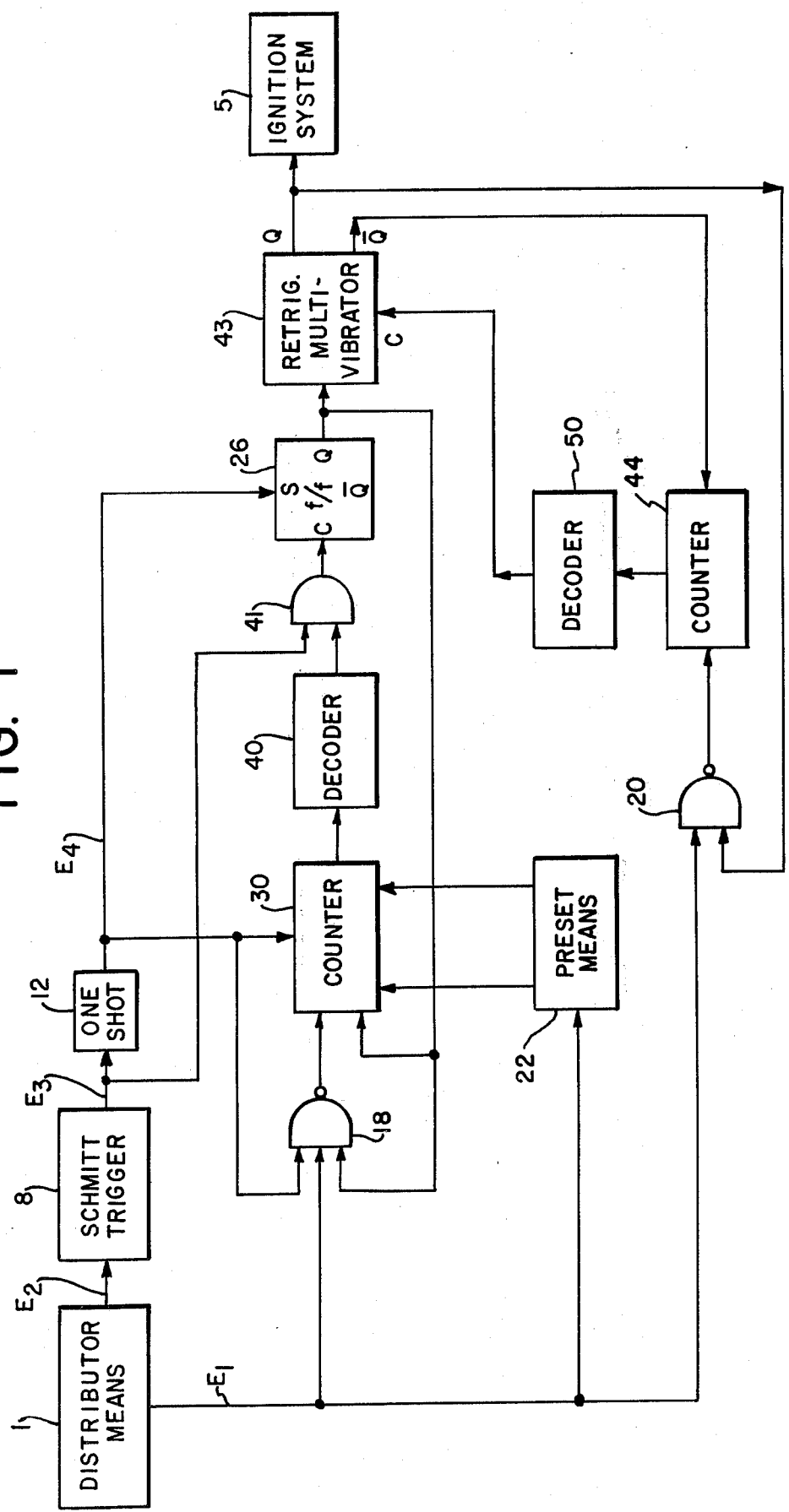
FIG. 1 is a simplified block diagram of a control system, constructed in accordance with the present invention for controlling the occurrence and the duration of time intervals during which sparks are provided in an internal combustion engine.

Referring to FIG. 1, distributor means 1 provides pulse signals $E_1$, $E_2$. If for example, an ignition system 5 provides ignition for an eight-cylinder engine (not shown) having a throttle (not shown) and a carburator (not shown), then eight positive pulses in signal $E_2$ would comprise one cycle. Each cycle or pulse signal $E_2$ corresponds to two full turns of the crankshaft.

A positive pulse $E_1$ occurs each time a predetermined amount of a crankshaft (not shown) rotation occurs. Thus, while the time between successive pulses $E_1$ will vary with engine speed, the angular distance between pulses $E_1$, as related to the crankshaft is constant at all engine speeds. However since pulse signal $E_1$ corresponds to engine speed, it may be obtained by means other than the distributor such as counting the teeth on the flywheel.

Ignition system 5 may be of the type disclosed and described in U.S. Pat. No. 3,792,695 (issued Feb. 19, 1974) in which the signal applied to ignition system 20 would be applied to transistor 72, and elements 54, 51, 65, 67 and 66 will be omitted. However, ignition system 5 is not restricted to U.S. Pat. No. 3,792,695.

Pulse signal $E_2$ is applied to a Schmitt trigger 8 which shapes pulses $E_2$ to provide shaped rectangular pulses $E_3$ to a one-shot multivibrator 12. One-shot 12 is triggered by pulses $E_3$ to provide negative inhibiting pulses $E_4$ to a NAND gate 18.

Pulse signal $E_1$ is applied to NAND gates 18, 20 and to preset means 22. Pulses $E_2$ from one-shot 12 trigger a flip flop 26 to a set state. Flip flop 26 when in the set state provides a Q output at a high level and a $\overline{Q}$ output at a low level. Flip flop 26 provides the Q and $\overline{Q}$ outputs at a low level and a high level, respectively, when in a clear state.

The output from NAND gate 18 is applied to an input of a programmable counter 30. Counter 30 is preloaded by preset means 22 and a register 33 to correspond to certain operating parameters, as hereinafter explained.

The pulse output from one-shot 12 sets flip flop 26 to a clear state, causing the $\overline{Q}$ output to go to a high level, partially enabling NAND gate 18 upon the termination of the pulse from one-shot 12, NAND gate 18 becomes fully enabled so that it passes pulses $E_1$ to counter 30 which counts them. When counter 30 reaches a predetermined count, a decoder 40 provides a low level output response to counter 30 reaching the predetermined count. The output from decoder 40 is applied to an AND gate 41.

AND gate 41 also receives positive pulses $E_3$ until the predetermined count is reached. AND gate 41, in response to a pulse $E_3$ and the high output from decoder 40, provides a high output to the clear input of flip flop 26 which does not affect the status of flip flop 26. When decoder 40 output changes to a low level, AND gate 41 output changes to a low level triggering flip flop 26 to a clear state causing the Q output to go to a low level. The change to the low level of the Q output disables NAND gate 18 to stop the counting process and clears counter 30. The Q output from flip flop 26 is also applied to a retriggerable multivibrator 43 providing a Q output to ignition system 5. Multivibrator 43 is triggered with the Q output of flip flop 26 goes to a low level. The Q output of multivibrator 43 goes to a high level when multivibrator 43 is triggered. Ignition system 5 provides sparks to the cylinders of the engine when the Q output of multivibrator 43 is at a high level.

Thus after certain amount of pulses $E_1$ from distributor means 1, counting from the point of maximum spark advance, the spark will occur. The number of pulses that counter 30 is allowed to count determines amount of spark advance or retard as a function of crankshaft degrees and not time.

If in the sequence, counter 30 does not cause decoder 40 to disable AND gate 41 as hereinbefore explained, then the initiation of the spark will occur at maximum spark retard in terms of angular degrees. Pulse $E_2$ will go to a low level causing pulse $E_3$ also to go to a low level, thereby disabling AND gate 41. This causes flip flop 26 to change to a clear state, thereby triggering multivibrator 43 initiating the spark time interval.

The spark time interval is terminated in the following manner. The high level Q output from retriggerable multivibrator 43 enables NAND gate 20 allowing pulse signal $E_1$ to pass through and be counted by a counter 48. When counter 48 reaches a predetermined count corresponding in angular degrees of crankshaft to the duration of the spark time interval. A decoder 50 provides a pulse output to multivibrator 43 causing it to provide the Q output at a low level and a $\bar{Q}$ output at a high level. When multivibrator 43 was triggered, its $\bar{Q}$ output went from a high level to a low level and cleared counter 48.

Thus, since NAND gate 20 is only enabled when multivibrator 43 Q output is at a high level, it will count the pulses $E_1$ until it reaches a predetermined count which causes the counter 50 to provide the pulse to multivibrator 43, so that no matter how fast the crankshaft is rotating the duration of the spark time interval, during which sparks are provided to the engine by ignition systems, occurs for a fixed angular displacement.

Figure 2:
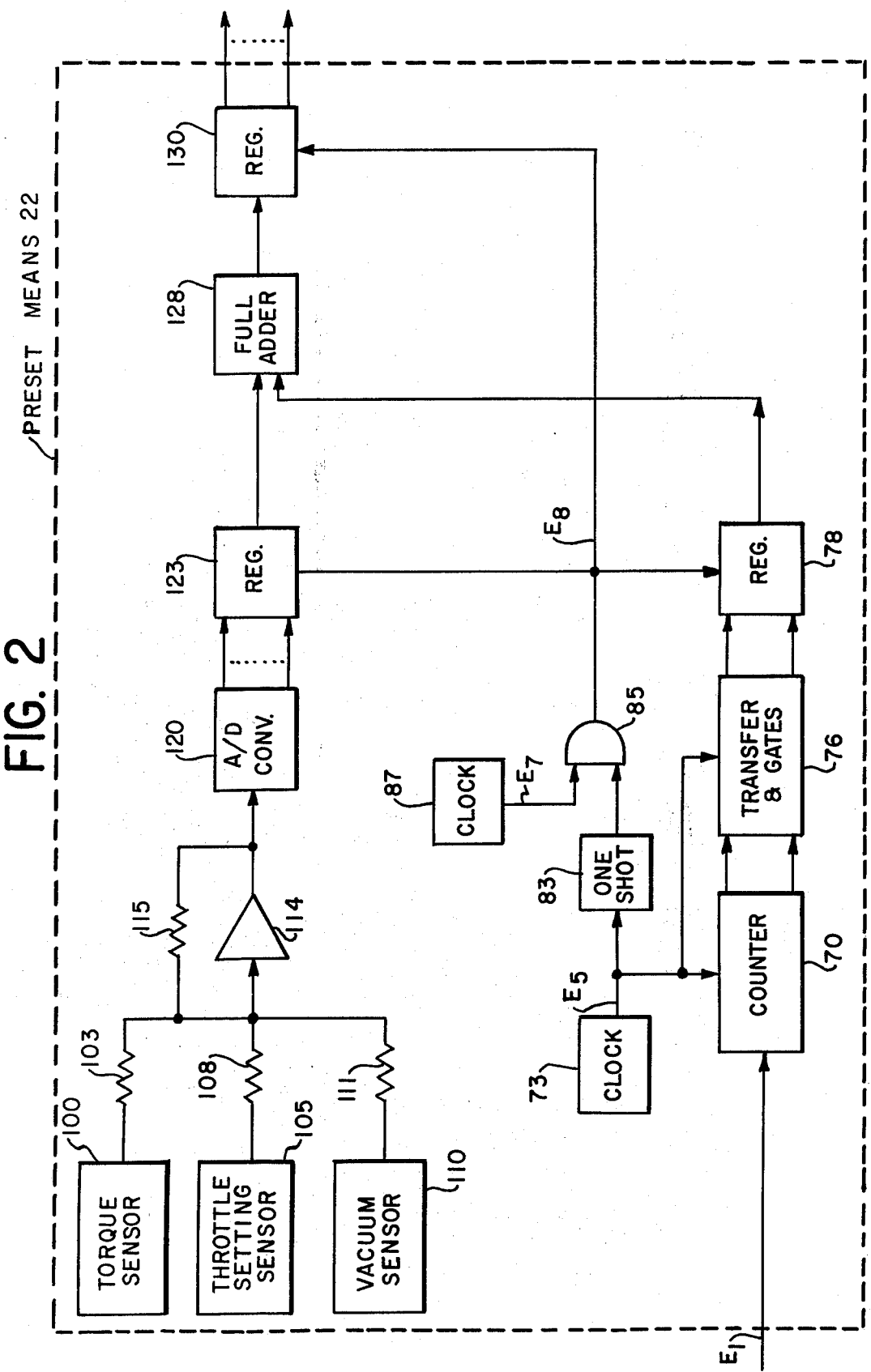
FIG. 2 is a detailed block diagram of the preset means shown in FIG. 1.

Referring now to FIG. 2, preset means 22 includes a counter 70 receiving pulse signal $E_1$. The pulse repetition rate of pulse signal $E_1$ corresponds to the rotational speed of the crankshaft. Counter 70 counts pulses $E_1$ and is periodically reset by the trailing edge of a pulse $E_5$ provided by clock means 73. Pulse $E_5$ is also applied to a plurality of transfer AND gates 76 which transfers the count in counter 70 to a register 78 just prior to counter 70 being reset by the trailing edge of pulse $E_5$. The trailing edge of pulse $E_6$ triggers a one shot multivibrator 83 which provides a pulse to an AND gate 85 receiving timing pulses $E_7$ from a clock 87. The width of the pulse from one shot 83 is selected in a manner so that a predetermined number of pulses $E_7$ from clock 87 is passed by AND gate 85 and provided as shift pulses $E_8$ to register 78.

A torque sensor 100 measuring the torque of the crankshaft provides a signal corresponding to the measured torque to a resistor 103. A sensor 105 senses the throttle position and provides a corresponding signal to another resistor 108. A vacuum sensor 110 senses the vacuum in the carburetor and provides a corresponding signal to a resistor 111. Resistors 103, 108 and 111 are connected to the input of an amplifier 114, having a feedback resistor 115 connecting its input to its output. Resistors 103, 108, 111 and 115 in cooperation with amplifier 114 form a summing network. The output from amplifier 114 is converted to digital signals by digital converter 120 where it is provided to a register 123. When shift pulses $E_8$ occur, the contents of registers 123, 78 are shifted through a full adder 128, where they are digitally added, into a storage register 130 receiving shift pulses $E_8$. The digital signals from register 130 are provided to counter 30 where they are entered into counter 30 upon the occurrence of pulse $E_4$.

The system of the present invention as hereinbefore described controls the occurrence and the duration of time intervals during which sparks are provided in a multicylinder internal combustion engine. The system controls the occurrence of the spark time intervals as a function of the operating parameters of the engine. The duration of the spark time intervals are controlled so that the duration may vary as a function of time, but remains fixed in relation to the amount of angular displacement of the crankshaft.

What is claimed is:

1. A system for controlling the occurrence and duration of time intervals during which sparks are provided in a multicylinder internal combustion engine for driving a crankshaft in which each cylinder has a moveable piston, comprising means for providing a first pulse signal whose pulse repetition rate corresponds to the rotational speed of the crankshaft; distributor means for providing a second pulse signal, each pulse in each cycle in the second pulse signal having a width corresponding to a predetermined rotational displacement of the crankshaft and having a relationship to the position of a piston in a corresponding cylinder; means for providing a spark time interval pulse signal, each pulse in the spark time interval pulse signal starting in response to a start pulse and terminating in response to a stop signal; means connected to the distributor means for shaping the pulses in the second pulse signal, programmable means connected to the first pulse signal means, to the shaping means and to the distributor means for providing the start pulses in accordance with the shaped pulses and the first pulse signal, the programmable means includes a flip flop having a set input, a clear input and an output; said flip flop providing a voltage at its output in accordance with its state; a one-shot multivibrator connected to the pulse shaping means and the set input of the flip flop and responsive to each pulse from the pulse shaping means for proving a negative going pulse to trigger the flip flop to a set state; a counter; first switching means connected to the output of the flip flop to the counter, and to the one-shot multivibrator and receiving the first pulse signal from the first pulse signal means for blocking the first pulse signal when the one-shot multivibrator provides a pulse or the flip flop is in a clear state and for passing the first pulse signal to the counter when the one-shot multivibrator does not provide a pulse and the flip flop is in a set state so that the counter counts the pulses in the first pulse signal from a count preloaded into it by the programming means; a decoder connected to the counter for providing a high level output until the count reaches the predetermined count and then providing a low level output, and AND gate receiving the shaped pulses and the output from the decoder for providing an output to the clear input of the flip flop so that when the counter reaches a predetermined count the output from the AND gate does from high level to a low level causing the flip flop to change from a set state to a clear state or when a shaped pulse terminates before the counter reaches the predetermined count to go from the high level to the low level; means for sensing the operating parameters of the engine and of the crankshaft and providing signals corresponding thereto; programming means connected to the first pulse signal means and to the sensing means for programming the programmable means in accordance with the sensed parameter signals and the first pulse signal so as to control the occurrence of the start pulses; means connected to the distributor means and to the spark time interval pulse signal means for providing the stop signal to the spark time interval pulse means in accordance with the first pulse signal from the first pulse signal means and the spark time interval pulse signal so as to control the duration of each spark time interval pulse; and ignition means connected to the spark time interval pulse signal means for providing sparks in the engine during the occurrence of a pulse in the spark time interval pulse signal and not providing sparks in the engine when a pulse in the spark time interval pulse signal does not occur.

2. A method for controlling the occurrence and duration of time intervals during which sparks are provided in a multicylinder internal combustion engine for driving a crankshaft in which each cylinder has a movable piston, comprising providing a first pulse signal whose pulse repetition rate corresponds to the rotational speed of the crankshaft; providing a second pulse signal, each pulse in each cycle in the second pulse signal having a width corresponding to a predetermined rotational displacement of the crankshaft and having a relationship to the position of a piston in a corresponding cylinder; providing a spark time interval pulse signal, each pulse in the spark time interval pulse signal starting in response to a start pulse and terminating in response to a stop signal; shaping the pulses in the second pulse signal; providing the start pulses in accordance with the shaped pulses and the first pulse signal, the start pulse step includes providing a voltage with a flip flop, the amplitude of said voltage corresponding to the state of the flip flop, providing a negative going pulse in response to each shaped pulse to trigger the flip flop to a set state, counting the pulses of the first pulse signal when the one-shot multivibrator does not provide a pulse and the flip flop is in a set state, not counting the pulses in the first pulse signal when the one-shot multivibrator provides a pulse or the flip flop is in a clear state, providing a high level signal until the counting step reaches a predetermined count and then providing a low level signal, triggering the flip flop to a clear state when the high level signal changes to a low level or when a shaped pulse terminates before the counting step reaches the predetermined count so that the flip flop in effect provides the start pulses; sensing operating parameters of the engine and of the crankshaft; providing signals corresponding to the sensed parameters; controlling the occurrence of the start pulses in accordance with the sensed parameter signals and the first pulse signal; providing the stop signal in accordance with the first pulse signal and the spark time interval pulse signal so as to control the duration of each spark time interval pulse; providing sparks in the engine during the occurrence of a pulse in the spark time interval pulse signal and not providing sparks in the engine when a pulse in the spark time interval pulse signal does not occur.

3. A system as described in claim 1 in which the stop signal means includes a second counter, an AND gate receiving the first pulse signal from the first signal means and the spark time interval pulse signal so that upon occurrence of a spark time interval pulse the pulses of the first pulse signal are passed to the second counter for counting, and a second decoder connected to the spark time interval pulse signal means and to the second counter for providing the stop signal to the spark time interval pulse signal means when second counter reaches a second predetermined count.

4. A system as described in claim 3 in which the programming means includes means connected to the sensing means for summing the sensed parameter signals and providing a corresponding sum signal, means connected to the summing means for converting the sum signal to digital signals, means receiving the first pulse signal for providing digital signals corresponding to the rotational speed of the crankshaft in accordance with the first pulse signal, means for providing shift pulses, first register means connected to the converting means for storing the digital signals corresponding to the sum signal, second register means connected to the rotational speed signal means and to the shift pulse means for storing the rotational speed digital signals, means for adding the digital signals from the first and second register means in response to the shift pulses, and third register means connected to the adding means and to the shift pulse means for storing the added digital signals and providing corresponding digital signals as programming signals to the programmable means.

5. A system as described in claim 4 in which the rotational speed signal means includes third counter means for counting the pulses in the first pulse signal, means for providing clock pulses to the third counter means, a plurality of transfer AND gates connecting the third counter means to the second register means and receiving the clock pulses so that each clock pulse causes the transfer AND gates to transfer the count from the third counter means to the second register means while the trailing edge of each clock pulse resets the third counter means to zero.

6. A system as described in claim 5 in which the shift pulse means includes means for providing timing pulses, a second one-shot multivibrator connected to the clock means and providing a pulse of a predetermined width in response to each clock pulse, another AND gate connected to the timing pulse means and to the second one-shot multivibrator and responsive to each pulse from the second one-shot multivibrator to pass a predetermined number of timing pulses as shift pulses and responsive to absence of a pulse from the second one-shot multivibrator to block the timing pulses from the timing pulse means.

7. A method as described in claim 2 in which the counting step includes providing a count in accordance with the sensed parameter signals and the first pulse signal and the counting starts from the provided count.

8. A method as described in claim 7 in which the stop signal step includes counting the pulses of the first pulse signal when spark time interval pulse signal has a pulse, not counting the pulses of the first pulse signal when a pulse does not occur in the spark time interval pulse signal, and providing the stop signal when the last mentioned counting step reaches a second predetermined count.

* * * * *